(12) United States Patent
Patru et al.

(10) Patent No.: US 9,988,727 B2
(45) Date of Patent: Jun. 5, 2018

(54) COMPOSITE ELECTRODES FOR THE ELECTROLYSIS OF WATER

(71) Applicants: CENTRE NATIONAL DE LA RECHERCHE SCIENTIFIQUE, Paris (FR); UNIVERSITE DE MONTPELLIER, Montpellier (FR); BULANE, Fabregues (FR)

(72) Inventors: Alexandra Patru, Windisch (CH); Frederic Favier, Saint Clement de Riviere (FR); Nicolas Jerez, Fabregues (FR)

(73) Assignees: CENTRE NATIONAL DE LA RECHERCHE SCIENTIFIQUE, Paris (FR); UNIVERSITE DE MONTPELLIER, Monpellier (FR); BULANE, Fabregues (FR)

( * ) Notice: Subject to any disclaimer, the term of this patent is extended or adjusted under 35 U.S.C. 154(b) by 480 days.

(21) Appl. No.: 14/419,005

(22) PCT Filed: Aug. 2, 2013

(86) PCT No.: PCT/EP2013/066276
§ 371 (c)(1),
(2) Date: Feb. 2, 2015

(87) PCT Pub. No.: WO2014/020151
PCT Pub. Date: Feb. 6, 2014

(65) Prior Publication Data
US 2015/0191834 A1 Jul. 9, 2015

(30) Foreign Application Priority Data
Aug. 3, 2012 (FR) ...................... 12 57612

(51) Int. Cl.
 *C25B 11/03* (2006.01)
 *C25B 11/04* (2006.01)
 *C25B 1/04* (2006.01)

(52) U.S. Cl.
 CPC ................ *C25B 11/04* (2013.01); *C25B 1/04* (2013.01); *C25B 11/03* (2013.01);
 (Continued)

(58) Field of Classification Search
 CPC ................ C25B 11/03; C25B 11/0489; C25B 1/04–1/12
 See application file for complete search history.

(56) References Cited

U.S. PATENT DOCUMENTS 3,871,988 A * 3/1975 Harke ..................... C25B 11/03
 204/284
4,208,451 A 6/1980 Appleby et al.
(Continued)

FOREIGN PATENT DOCUMENTS

EP 0622861 A1 * 11/1994 ............... C25B 9/10
FR 2518583 6/1983
(Continued)

OTHER PUBLICATIONS

Guillaume Couture et al., "Polymeric materials as anion-exchange membranes for alkaline fuel cells", Progress in Polymer Science, Apr. 21, 2011, pp. 1521-1557.
(Continued)

*Primary Examiner* — Nicholas A Smith
(74) *Attorney, Agent, or Firm* — Greer, Burns & Crain, Ltd.

(57) ABSTRACT

An electrode is provided that is suitable for use with the electrolysis of water in a liquid electrolyte medium, the electrode formulated by the following formulation method:
 a) dissolving, in a volatile solvent or a mixture of volatile solvents, at least one ion-conducting polymer binder
(Continued)

that allows, in the solid state, the diffusion of the gases formed during electrolysis;

b) adding, to the solution obtained in step a), at least one electrocatalytic material in the form of divided powder, in order to obtain a mixture; and c) depositing the mixture obtained in step b) on a metallic or metallic-type conductive support or collector, said support or said collector being openwork and chemically stable in an aqueous medium, steps a) and b) being able to be implemented simultaneously, successively or to be reversed.

11 Claims, 4 Drawing Sheets

(52) U.S. Cl.
CPC ......... *C25B 11/0489* (2013.01); *Y02E 60/366* (2013.01); *Y02P 20/132* (2015.11); *Y02P 20/133* (2015.11)

(56) References Cited

U.S. PATENT DOCUMENTS

| | | |
|---|---|---|
| 4,236,993 A | 12/1980 | Muller et al. |
| 4,394,231 A | 7/1983 | Nicolas |
| 4,534,837 A | 8/1985 | Nicolas et al. |
| 4,585,532 A | 4/1986 | Martin et al. |
| 5,271,813 A | 12/1993 | Linkous |
| 5,330,860 A | 7/1994 | Grot et al. |

FOREIGN PATENT DOCUMENTS

| | | | |
|---|---|---|---|
| GB | 2006266 | | 5/1979 |
| GB | 1565040 | | 4/1980 |
| GB | 2015579 | | 8/1982 |
| JP | 2010065283 | | 3/2010 |
| JP | 2010065283 A | * | 3/2010 |
| JP | 2012065283 | | 3/2012 |

OTHER PUBLICATIONS

"Database WPI", Thomson Scientific, London, Feb. 4, 2013, pp. 1-2.

French Search Report from French Patent Application No. 1257612, dated Jan. 30, 2013.

International Search Report from International Application No. PCT/EP2013/066276, dated Oct. 18, 2013.

* cited by examiner

COMPOSITE ELECTRODES FOR THE ELECTROLYSIS OF WATER

BACKGROUND

A subject of the present invention is an electrode suitable to be used for the electrolysis of water in a liquid electrolyte medium, a method for formulating such an electrode, a device for the electrolysis of water comprising said electrode, and a method for producing a hydrogen/oxygen mixture or hydrogen alone or oxygen alone.

Pure oxygen is mainly used in the iron and steel industry and in petrochemistry. Other methods also require large tonnages of oxygen, in particular the bleaching of papermaking pulp, the reprocessing of certain types of chemical waste and the production of high-temperature flames. Oxygen is also used as a medical gas in normobaric or hyperbaric oxygen therapy.

Currently, oxygen is obtained industrially mainly by cryogenic separation of the compounds of air, i.e. by liquefaction of air followed by fractional distillation. Pure oxygen can also be obtained by the electrolysis of water.

Hydrogen is one of the raw materials of the chemical and petrochemical industry. It is used in particular for the production of ammonia and methanol and for oil refining; it is also utilized in the metallurgy, electronics and pharmacology sectors, as well as in the processing of foodstuffs.

Hydrogen is also a promising energy carrier, as a replacement for fossil hydrocarbons, in particular in the field of transport. It can be used directly in internal combustion engines, or it can supply fuel cells producing electricity. It is also an energy storage means which can be used in case of need in installations for the production of electricity of the wind power, and photovoltaic panel type and nuclear power stations where the electricity generated is not constant.

Hydrogen is not directly available in nature but it can be produced from three major sources which are fossil, nuclear and renewable energy sources.

Today, 90% of hydrogen gas is produced industrially either by steam reforming of methane (cracking of natural gas using high-temperature steam) or by partial oxidation (production of hydrogen from heavy hydrocarbons and oxygen). These two methods have the drawback of emitting large quantities of $CO_2$.

A third method, electrolysis of water, constitutes the most "sustainable" solution for the production of hydrogen. It is a clean means of producing hydrogen because the greenhouse gas (GHG) and $CO_2$ emissions per kilogram of hydrogen produced are essentially linked to the electrical energy source used for the electrolysis. This means of producing hydrogen can be supplied with electrical energy of renewable origin and makes it possible to store electricity in chemical form.

Electrolysis of water consists of breaking down the atoms of oxygen and hydrogen combined in the water molecules, according to the reaction

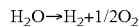

$$H_2O \rightarrow H_2 + 1/2 O_2$$

An electrolysis cell is constituted by two electrodes (anode and cathode, electronic conductors) connected to a DC generator, and separated by an electrolyte (ion-conducting medium).

This electrolyte can be either:
solid, and can then be:
either a proton exchange polymer membrane: in this technology, called PEM (Proton Exchange Membrane), a proton exchange membrane or polymer electrolyte membrane is used. This is a semipermeable membrane that allows proton conduction while being impermeable to gases such as oxygen or hydrogen. The advantages of PEM technology are the compactness, the simplicity of operation and the limitation of corrosion problems. However, the cost of the polymer membrane and the use of catalysts based on noble metals lead to relatively expensive equipment.

or an $O_2^-$ ion-conducting ceramic membrane: one of the features of this technology (SOFC—Solid Oxide Fuel Cell) is the use of a solid electrolyte, which acts as a conductor for the oxygen anion. This is usually ytterbium-doped zirconium. The electrodes can be made of steel or ceramic depending on the operating temperatures and the desired electrolyte.

or liquid, and is then an aqueous acid or base solution.

In the case of the electrolysis of water in an acid medium, the electrolyte is a solution of a strong acid, for example a solution of sulphuric acid ($H_2SO_4$) or of hydrochloric acid (HCl). However, managing concentrated acid electrolytes poses corrosion problems, and the technical solutions are very expensive.

Alkaline electrolysis is therefore the most widespread technology for the production of electrolytic hydrogen. In an alkaline electrolyzer, the electrolyte is an aqueous solution of potassium hydroxide (KOH). The ionic conduction is then ensured by the hydroxide ($OH^-$) and potassium ($K^+$) ions.

Current alkaline electrolysis systems operate at a voltage comprised between 1.7 and 2.1 V. The KOH solution has a concentration comprised between 25% and 35%. This method is currently implemented in conjunction with inexpensive sources of electricity (for example, hydraulic). Studies have also been conducted into particular cases, such as the operation of power stations during off-peak times or nuclear power stations dedicated to providing electricity to hydrogen production plants. Sources still in development, such as photovoltaic cells, are also proposed for providing electricity on a large scale for this method.

Today, nickel deposited on steel or solid nickel are the most commonly used electrode materials in industrial alkaline electrolysis systems.

The deposition technique used most often today in order to manufacture electrodes for the alkaline electrolysis of water is electrodeposition. This approach is of interest from an economical point of view as it limits the quantity of electrode material used. Moreover, it makes it possible to manufacture mechanically stable layers. The drawbacks of this technique are the limitation of the surface area developed by the electrode in contact with the electrolyte, leading to a deficiency in the associated performance and the complexity of the chemical compositions.

Different methods for manufacturing electrodes have already been proposed for cells for the decomposition of water by electrolysis, whether in an acid medium or in a base medium. There may be mentioned in particular:

the thermal decomposition of a salt of one or more precursor metals on a metallic support as described in the patent applications and patents FR 2581082, FR 2460343, FR 2547598, FR 2418280 and FR 2418281, the electrodeposition of one or more metal salts on an electronic-conductor support such as described in the patent applications and patents FR 2385817, FR 2402477 and the plasma deposition described in international application WO 2008067899 and the patent FR 2518583.

Another example of the manufacture of electrodes for the electrolysis of water is described in the patent FR 2446870.

The composite electrodes are composed of polytetrafluoroethylene (PTFE), carbon and noble metal oxides (Ru, Ir) by a multi-step method (grinding, heat treatment, pressing). The two main drawbacks of this method are its complexity and the choice of the materials used, which are not entirely suitable for this type of application. In fact, the polymer binder used (PTFE) is insulating and hydrophobic, which tends to reduce the performance of the electrodes. Moreover the carbon, although it has a good electrical conductivity, has a reduced resistance to corrosion under alkaline conditions.

The application JP 2012 065283 relates to an electrolysis method for the production of hydrogen gas which involves the reduction of water and the oxidation of ammonia gas, and a device for implementing said method. The ink is deposited on a transfer surface (PTFE membrane), then a transfer of the catalytic layer of PTFE to the surface of a metal foam is carried out, followed by assembly of the electrodes on each face of an anion membrane and impregnation of the anion membrane with KOH (or NaOH). This membrane acts as a solid electrolyte that makes it possible to transport the OH— ions. Optionally, a thin layer of carbon can be added between the catalytic layer and the metal foam. Thus the device which is described is a device for $H_2O$/ammonia electrolysis based on the design of alkaline fuel cells, all the elements and assembling techniques of which it uses, ammonia replacing water in the anolyte compartment where nitrogen $N_2$ is produced instead of $O_2$. This device is a reverse alkaline fuel cell in which the hydroxide-conducting electrodes are impermeable to the gases (nitrogen and ammonia).

The application EP 0 622 861 relates to the manufacture of a membrane electrode assembly (MEA) for use as a fuel cell or for electrolysis for the synthesis of alkali metal hydroxides from the corresponding chlorides. These techniques use inks based mainly on Nafion®, which are deposited on the surface of ion (in this case proton) exchange membranes.

Efforts are therefore still to be made to increase the performance and the durability of the existing systems. To achieve this objective, novel electrode materials must be developed which will make it possible both to catalyse the electrochemical reactions in order to obtain a high current density for a low overpotential and to resist corrosion and mechanical stresses.

Recently, much research has focused on the development of novel electrocatalytic materials, in particular by structuring the conventional solid materials on the nanometric scale. Nanostructured materials are of interest in the field of catalysis and electrocatalysis because of their large developed surface area and the emergence of novel physical properties on this scale. In the different types of electrochemical reactions involved in the electrolysis of water in an alkaline medium, the use thereof is nevertheless difficult. This difficulty is, among other things, linked to the production of gas occurring at the two electrodes, which gives rise to stresses that are disadvantageous to the stability and mechanical integrity of the electrodes and which, as a result, leads to a loss of activity of the electrodes over time due to the loss of catalytic material.

SUMMARY

A purpose of the invention is to overcome the drawbacks of the state of the art, and in particular to propose a device for the electrolysis of water, in an alkaline liquid electrolyte medium or in an acid liquid electrolyte medium, comprising electrodes having:

- a good chemical and mechanical stability
- a good electrical conductivity
- a good ion conductivity
- a good hydrophilic/hydrophobic balance
- limited adsorption properties of the H2 and O2 gases formed
- a good permeability for water and gas
- a long service life
- a large active surface area and
- an ability to catalyse the water decomposition reactions.

A subject of the invention is a composite electrode combining a catalytic material and a binder, suitable to be used for the electrolysis of water in a liquid electrolyte medium, and formulated by a formulation method comprising the following steps:

a. dissolving, in a volatile solvent or a mixture of volatile solvents, at least one ion-conducting polymer binder that allows, in the solid state, the diffusion of the gases formed during the electrolysis, b. adding, to the solution obtained in step a), at least one electrocatalytic material in the form of divided powder, in order to obtain a mixture, and c. depositing the mixture obtained in step b) on a metallic or metallic-type conductive support or collector, said support or said collector being solid or openwork and chemically stable in an aqueous medium, steps a) and b) being able to be implemented simultaneously, successively or to be reversed.

Thus the electrode according to the invention is permeable to gases, suitable to be used in an electrolysis method using a liquid electrolyte and has the previously listed properties, in particular a good chemical and mechanical stability and a long life.

The polymer binder is chosen for its ability to be deposited in the form of a layer of variable thickness and for its ability to conduct ions in an aqueous medium and to diffuse the dissolved gases. The layer of variable thickness, advantageously comprised between 1 and 500 µm, in particular of the order of 10 to 100 µm, can in particular be a gel or a film.

In an advantageous embodiment of the invention, the electrode is hydrophilic and has low adsorption capacities for the H2 and O2 gases generated. Thus the contact time of the electrocatalyst with the electrolyte is maximized, which makes it possible to increase the efficiency of the transfer of material to the active surface and therefore the efficiency of the gas production process.

According to the invention, any electrocatalytic material known in the state of the art can be used, in the form of divided powder.

By divided powder is meant a powder constituted of particles of a micronic, submicronic or nanometric size. According to the invention, the divided powders are either commercially available or prepared by techniques known to a person skilled in the art. They can be used without limit in terms of their composition, their size, or their crystallinity. The high level of particles of the electrodes of the invention makes possible a good percolation of the electronic charges exchanged in the redox processes through the whole thickness of the film.

Within the meaning of the present invention, by metallic-type conductive support or collector is meant any conductive material having the same conduction properties as metals, for example graphite or certain conductive polymers such as polyaniline and polythiophene. This support can have any shape that makes it possible to deposit the mixture by a method chosen from the group comprising in particular dipping, printing, induction, pressing, coating, spin-coating, filtration, vacuum deposition, spray coating, casting, extrusion and laminating. As examples of printing techniques, there may be mentioned screen printing and inkjet printing.

Within the meaning of the present invention, the term support and the term collector are used equally.

By way of an example of a support, there may be mentioned a grid (openwork support), a plate or a sheet of stainless steel (304L or 316L for example) (solid supports). Thus, contrary to the known electrodes produced by using this type of formulation and for which it is essential that the conductive support is porous (foam, grid, carbon-containing fabric etc.), the electrode according to the present invention can be supported on a solid support.

The advantage of the mixture according to the invention is that it can be deposited on the solid or openwork collector, by usual deposition techniques which are readily available and make deposition possible in the form of layers of variable thicknesses ideally of the order of 10 to 100 µm.

According to the invention, the mixture can be prepared by any technique known to a person skilled in the art, in particular by mixing the binder and the at least one electrocatalytic material in the form of divided powder in a suitable solvent or mixture of suitable solvents in order to obtain a mixture with the rheological properties that make it possible to deposit the composite electrode materials in the form of a film with a controlled thickness on an electronic-conductor substrate. The use of the electrocatalytic material in the form of divided powder makes it possible to maximize the surface area developed by the electrodes and to enhance the associated performance. A person skilled in the art will know how to choose the different formulation parameters in the light of his general knowledge and the physicochemical characteristics of said mixtures.

The performance of the electrode according to the invention is improved compared with the conventional devices as, contrary to the electrodes of the prior art, any electrocatalytic material in the form of a powder with a large specific surface area is capable of being deposited in the form of a layer of variable thickness, which will be determined by a person skilled in the art as a function of the results that he wishes to obtain.

Advantageously, the ion-conducting polymer binder is:
either conductive as regards anion groups, in particular for the hydroxy group and is chosen from the group comprising in particular:
  polymers stable in an aqueous medium, which can be perfluorinated, partially fluorinated or non-fluorinated and which have cation groups that make it possible to conduct the hydroxide anions, said cation groups being of the quaternary ammonium, guanidinium, imidazolium, phosphonium, pyridium or sulphide type,
  non-grafted polybenzimidazole,
  chitosan, as well as
  mixtures of polymers comprising at least one of the different polymers mentioned previously, said mixture having anion-conducting properties,
or conductive as regards cation groups that make it possible to conduct protons, and is chosen from the group comprising in particular:
  polymers stable in an aqueous medium, which can be perfluorinated, partially fluorinated or non-fluorinated and which have anion groups that make it possible to conduct protons,
  grafted polybenzimidazole,
  chitosan, as well as
  mixtures of polymers comprising at least one of the different polymers mentioned previously, said mixture having cation-conducting properties.

Among the polymers stable in an aqueous medium and having cation groups that make it possible to conduct anions, there may be mentioned in particular polymer chains of the perfluorinated type, such as for example polytetrafluoroethylene (PTFE), of the partially fluorinated type, such as for example polyvinylidene fluoride (PVDF), or of the non-fluorinated type, such as polyethylene, which are grafted with anion-conducting molecular groups.

Among the polymers stable in an aqueous medium and having anion groups that make it possible to conduct protons, there may be considered any polymer chain stable in an aqueous medium containing groups such as $-SO_3^-$, $-COO^-$, $-PO_3^{2-}$, $-PO_3H^-$, $-C_6H_4O^-$. There may be mentioned in particular Nafion®, sulphonated or phosphonated polybenzimidazole (PBI), sulphonated or phosphonated polyether ether ketone (PEEK).

According to the present invention, it will be possible to use any mixture comprising at least two polymers, at least one of which is chosen from the previously mentioned groups of polymers, provided that the final mixture is ion-conducting in an aqueous medium; thus there may be mentioned by way of example a mixture comprising a polymer stable in an alkaline medium and having cation groups that make it possible to conduct the hydroxide anions with a polyethylene not grafted with anion-conducting molecular groups provided that this final mixture is anion-conducting in an alkaline medium; there may also be mentioned by way of example a mixture of a polymer stable in an acid or alkaline medium and having anion or cation groups that make it possible to conduct the protons or the hydroxides and grafted or non-grafted polybenzimidazole.

Polybenzimidazole (PBI) is used in the present invention as a binder. It is not intrinsically a good ion conductor, but in an alkaline or acid medium it proves to be an excellent polyelectrolyte with, respectively, very good anion- or cation-conducting properties. PBI is a polymer generally used, in grafted form, in the manufacture of proton-conducting membranes for fuel cells, in membrane-electrode assemblies and in PEM-type electrolyzers, as an alternative to Nafion®. In these applications, PBI is generally functionalized/grafted, for example by sulphonation, in order to make it proton-conducting. The role of the PBI in this type of system is then different from its role in the manufacture of the electrodes according to the present invention, where it is only used as a binder and has no direct role in the electrochemical reaction.

Even if its long-term stability in a concentrated acid medium is limited, chitosan, which can also be used as an anion- or cation-conducting polymer, is a polysaccharide that has ion-conducting properties in a basic medium which are similar to those of PBI. (G. Couture, A. Alaaeddine, F. Boschet, B. Ameduri, *Progress in Polymer Science* 36 (2011) 1521-1557).

Advantageously, the electrode according to the invention is formulated by a method which also comprises a step of removing the solvent at the same time as or after step c). The removal of the solvent can be carried out by any technique known to a person skilled in the art, in particular by evaporation or phase inversion.

In the case of evaporation, the solvent is an organic or inorganic solvent the evaporation temperature of which is lower than the decomposition temperature of the polymer binder used. There may be mentioned by way of example dimethyl sulphoxide (DMSO) or acetic acid. A person skilled in the art is capable of choosing the organic or inorganic solvent suitable for the polymer or for the mixture of polymers used as binder and able to be evaporated.

According to a preferred embodiment of the invention, the electrode is suitable to be used for the electrolysis of water in an alkaline liquid electrolyte medium and the polymer binder is then an anion conductor in an alkaline liquid electrolyte medium, in particular conductive as regards hydroxides.

Within the meaning of the present invention, by an alkaline liquid electrolyte medium is meant a medium the pH of which is higher than 7, advantageously higher than 10.

The binder is advantageously conductive as regards hydroxides in an alkaline medium. It is chemically stable in electrolysis baths and has the ability to diffuse and/or transport the $OH^-$ ions involved in the electrochemical reaction up to the surface of the particles, which are the sites of the redox reactions for producing the $H_2$ and $O_2$ gases. Thus, a surface which would not be in direct contact with the electrolyte is still involved in the electrolysis reaction, a key aspect of the efficiency of the system. The binder chosen and the shaping of the electrode do not hinder the diffusion of the gases formed and limit their adsorption, thus making it possible to discharge them.

According to another preferred embodiment of the invention, the electrode is suitable to be used for the electrolysis of water in an acid liquid electrolyte medium and the polymer binder is a cation conductor in an acid liquid electrolyte medium, in particular conductive as regards protons.

Within the meaning of the present invention, by acid medium is meant a medium the pH of which is lower than 7, advantageously lower than 2.

According to a preferred embodiment of the invention, the at least one electrocatalytic material is chosen from the group comprising Ni, Co, Pt, Ir, Mo, Cr, Fe, V, Mn, Ru, Pd, C, Ti, W, Si, Bi, P, Nb, Zr, Ta and Os, mixtures thereof, alloys thereof as well as simple or complex oxides thereof, such as for example $Co_3O_4$ or $NiCo_2O_4$.

The composition of the mixture according to the invention depends on the chemical nature and length of the polymer chain used as binder, on the dispersive and wetting character of the solvent, on the grain size/bulk density of the powder and on the type of deposition used. A person skilled in the art, in the light of his general knowledge, will be capable of defining the quantities of each component of the mixture, in particular in order to obtain a mixture the viscosity of which is suitable for the chosen deposition means. The viscosity depends in particular on the polymer/solvent ratio and on the nature of the particles of catalytic material. A person skilled in the art, from his knowledge, will know how to determine the most suitable conditions for utilizing the mixture to be deposited. The density of particles of catalytic material must be sufficient to achieve their electrical percolation threshold.

According to a preferred embodiment of the invention, the mass ratio of polymer binder/divided powder in the mixture is comprised between 10/90 and 90/10, advantageously comprised between 10/90 and 40/60.

By way of example, the quantity of polymer-powder mixture in the mixture to be deposited is comprised between 0.5 and 40% by mass relative to the total mass of the mixture, advantageously comprised between 2 and 20% by mass, and preferably equal to 5% by mass.

According to a preferred embodiment of the method according to the invention, the divided powder is present in the form of particles with an average diameter comprised between 1 µm and 5 µm (micrometric powder), or of particles with an average diameter comprised between 10 nm and 1 µm (submicrometric powder) or of particles with an average diameter comprised between 1 nm and 10 nm (nanometric powder).

Another subject of the invention is a method for formulating an electrode that allows diffusion of gases, suitable to be used for the electrolysis of water in a liquid electrolyte medium, comprising the following steps:

a. dissolving, in a volatile solvent or a mixture of volatile solvents, at least one ion-conducting polymer binder allows, in the solid state, the diffusion of the gases formed during electrolysis, b. adding, to the solution obtained in step a), at least one electrocatalytic material in the form of divided powder, in order to obtain a mixture, and c. depositing the mixture obtained in step b) on a metallic or metallic-type conductive support or collector, said support or said collector being chemically stable in an aqueous medium, steps a) and b) being able to be implemented simultaneously, successively or to be reversed.

Advantageously, the method according to the invention can also comprise a step of removing the solvent at the same time as or after step c).

Another subject of the invention is a device for the electrolysis of water to in order to produce a gaseous mixture of hydrogen and oxygen and/or to produce hydrogen alone and/or to produce oxygen alone, in a liquid electrolyte medium, comprising an anode, a cathode and an electrolyte, said device being characterized in that at least one of the anode and the cathode is an electrode formulated according to the invention.

Another subject of the present invention is a method for producing a hydrogen/oxygen mixture or hydrogen alone, or for producing oxygen alone by the electrolysis of water, either in an alkaline liquid electrolyte medium or in an acid liquid electrolyte medium, utilizing a device for electrolysis according to the present invention.

This device can be installed in series or in parallel.

BRIEF DESCRIPTION OF THE DRAWINGS

The invention is illustrated by Examples 1 to 7 and FIGS. 1 to 7, as follows.

DETAILED DESCRIPTION

Example 1—Preparation of the Electrodes 1.1. Material

The electrodes are manufactured on the basis of commercial micrometric Ni powders (5 µm, purity 99.7%, Aldrich), Co (>99.8%, Fluka), $Co_3O_4$ (>71% Co, Fluka) and laboratory-synthesized submicrometric and nanometric powders.

1.2. Preparation of the Support

A grid of 316L stainless steel (Gantois ref. no. 42.73 FR 0.25) is cut out and folded back on itself lengthwise, in order to obtain the final dimension of the electrode.

1.3. Preparation of the Electrode by Moulding the Film 1.3.1 Preparation of the Film A mixture comprising 90% by mass of a catalytic powder and 10% by mass of polymer binder (PBI) is dissolved at a rate of 5% by mass in dimethyl sulphoxide (DMSO).

A mould is produced using a self-adhesive Teflon® film deposited on a previously cleaned glass plate. A volume of the catalytic powder—PBI mixture is deposited in the mould. The volume of deposited mixture is suitable for the final quantity of catalytic powder desired in the electrode (surface density expressed in g of powder per m$^2$ of electrode).

The catalytic powder—PBI mixture is dried in an oven for a determined duration varying as a function of the volume deposited, and at a temperature specific to each type of mixture.

1.3.2. Support—Film Assembly

The film is cut to the desired final electrode size. In order to fix the system, the film is dipped in ultrapure water. The film is then detached from the glass plate, then placed between the two planes of the previously shaped grid. The rough assembly produced in this way is pressed at 5 tonnes/cm$^2$ for approximately 2 minutes. The mixture is dried in the oven in order to remove residual moisture from it. The composite assembly produced in this way constitutes a solid electrode ready for operation.

1.4. Preparation of the Electrode by Dipping

The stainless steel grid is dipped directly into a 90-10% mixture of $Co_3O_4$-PBI Celanese® at 5% by mass in DMSO, prepared as indicated in Example 1.1, then in pure water using tongs. The mixture is dried at 150° C. The operations are repeated until a complete covering of the support is obtained.

Example 2—Characterization of the Electrodes Based on Micrometric Nickel Powders and PBI The catalytic activities of the electrodes according to the invention are determined from the polarization curves. The measurements were carried out in a standard cell with three electrodes (Ag/AgCl/3MNaCl reference electrode, platinum counter electrode, and work electrode corresponding to the electrode to be characterized). The set of characterizations was carried out at ambient temperature in a 1 mol/L solution of potassium hydroxide.

A commercial nickel powder having an average particle diameter of 5 µm and PBI is used. The composite electrodes based on nickel powder are prepared by moulding and have a Ni powder loading rate of 5, 10 and 40 mg/cm$^2$ of electrode.

Figure 1:
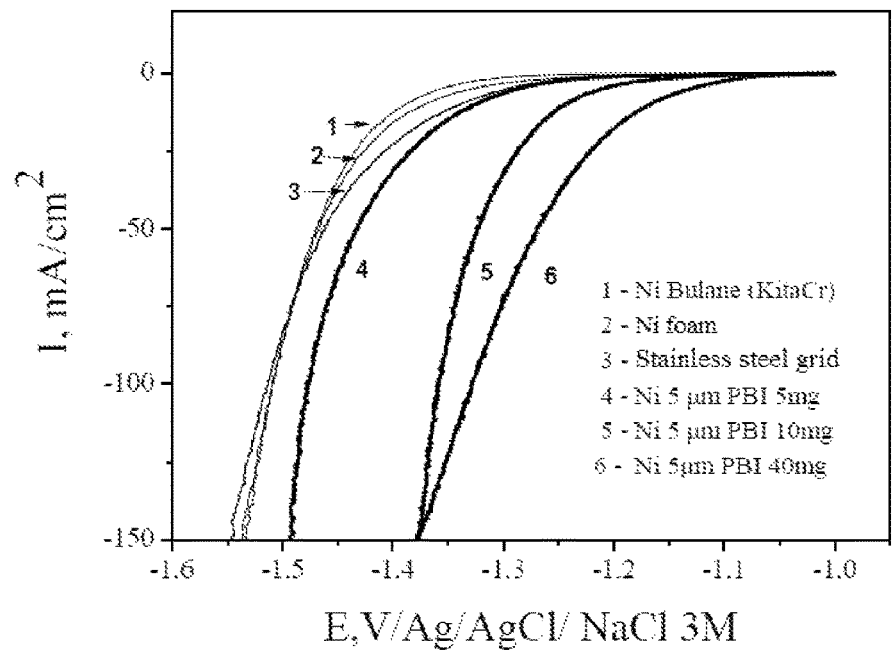
FIG. 1 shows the cathodic polarization curves measured according to Example 2 for composite electrodes according to the invention prepared in accordance with Example 1 from a mixture of micrometric Ni and PBI (90/10) and having different Ni loading rates, compared with those of electrodes based on electrodeposited Ni, Ni foam or formed of a stainless steel grid.

The polarization curves obtained are shown in FIG. 1. They were recorded at a speed of linear potential variation of 1 mV/s. The curves shown were corrected for ohmic drop. These different electrodes were compared with a stainless steel electrode (simple support), a high-purity nickel foam electrode (Goodfellow NI003852/1), and an electrodeposited nickel electrode (Kitachrome 25 µm on mild steel). The polarization curves shown make it possible to measure the corresponding overpotentials of $H_2$ production as a function of the nature of the electrode: the smaller the overpotential is (as an absolute value), the more efficient the system is.

The cathodic overpotential is considerably reduced with the composite electrodes based on nickel according to the invention compared with the other electrodes. Thus, for a current density of 100 mA/cm$^2$, the overpotentials obtained respectively for the stainless steel, the electrodeposited nickel (Kitachrome 25 µm on mild steel), the nickel foam, the composite electrodes according to the invention with 5 mg/cm$^2$ of Ni, with 10 mg/cm$^2$ of Ni and with 40 mg/cm$^2$ of Ni are given in Table 1.

TABLE 1

| Measurements of overpotentials deduced from the polarization curves of FIG. 1 for a current density of 100 mA/cm$^2$ | |
|---|---|
| Composition of the electrode | Overpotential (mV) |
| Stainless steel grid | 475 |
| Electrodeposited Ni (Kitachrome 25 µm on mild steel) | 488 |
| Ni foam | 475 |
| Ni 5 mg/cm$^2$ | 450 |
| Ni 10 mg/cm$^2$ | 332 |
| Ni 40 mg/cm$^2$ | 302 |

These results thus show that the electrodes according to the invention are much more efficient than the reference electrodes corresponding to the state of the art.

Example 3—Electrodes Based on Nanometric Nickel Particles and PBI

Composite electrodes were manufactured with laboratory-synthesized nickel powders of nanometric size and PBI in accordance with Example 1. The Ni loading rate of the electrodes is 5 mg/cm$^2$.

Figure 2:
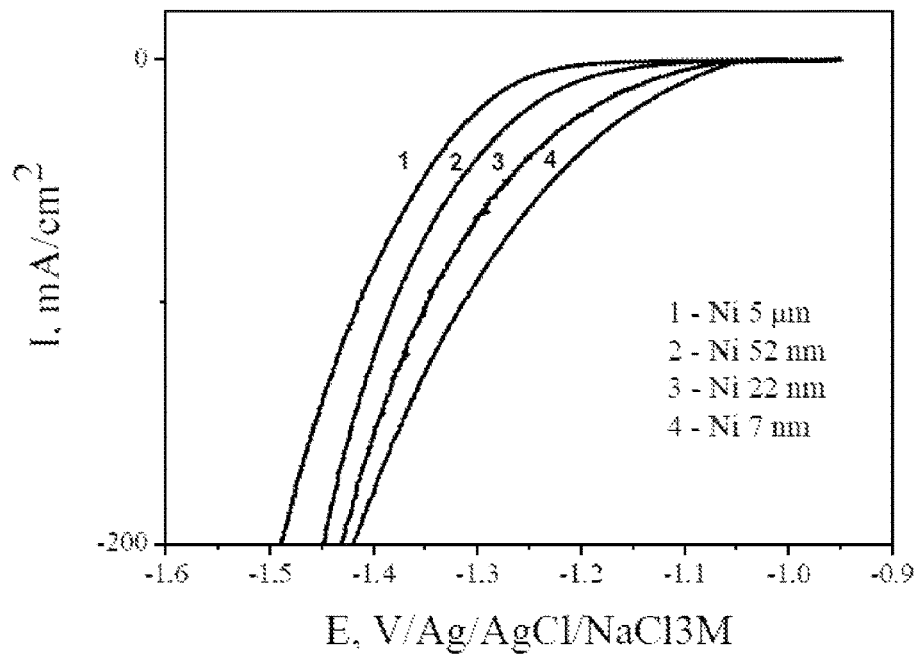
FIG. 2 shows the cathodic polarization curves for composite electrodes according to the invention having a nanometric Ni loading rate of 5 $mg/cm^2$, measured in accordance with Example 3.

The polarization curves for the different types of electrodes are given in FIG. 2.

With a nanometric structuring of the nickel and keeping the production process of the electrodes identical to that used for the micrometric powders, better results than those obtained for the micrometric powders can be observed for certain compositions. Here, at 100 mA/cm$^2$ of electrode, lower overpotentials are recorded, for example equal to −352 mV for an electrode based on nanostructured nickel powder with an average particle size of 52 nm, equal to −321 mV for an electrode based on nanostructured nickel powder with an average particle size of 22 nm, equal to 286 mV for an electrode based on nanostructured nickel powder with an average particle size of 7 nm.

These results thus show that the electrodes according to the invention, thanks to the increase in surface area due to the use of divided powder(s), are much more efficient than the reference electrodes corresponding to the state of the art.

Example 4—Study of the Durability of an Electrode Based on Nickel at 40 mg/Cm² (Ni/PBI 90/10)

A study of the durability of a composite electrode based on Ni 40 mg/cm² and on PBI was carried out under the same experimental conditions as the polarization curves of Example 2. The electrode was prepared by moulding, as described in Example 1. The work electrode was kept at a potential of −1.7 V/Ag/AgCl/3MNaCl (or a high overpotential of −700 mV) and the evolution of the current was measured as a function of time by amperometry. For comparison, the simple stainless steel grid was tested under the same conditions.

Figure 3:
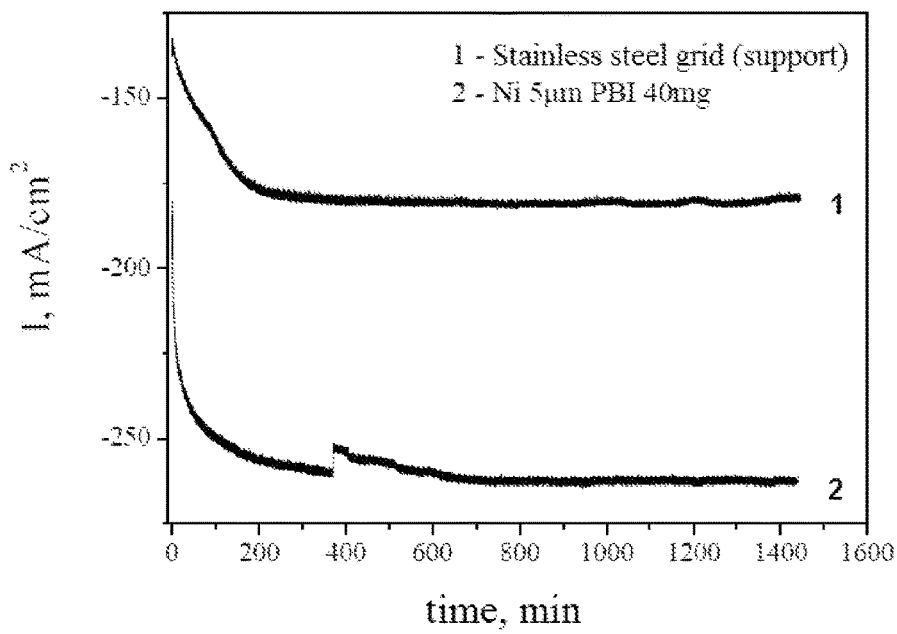
FIG. 3 shows the electric current density curve of a device for electrolysis according to the invention (Ni loading rate 40 $mg/cm^2$-Ni/PBI mixture (90/10)) as a function of time compared with a device comprising a simple stainless steel grid as electrode, measured in accordance with Example 4.

The results are shown in FIG. 3.

After 24 hours of continuous operation under forced rate conditions, no loss of material nor loss of activity were observed for the electrodes according to the invention.

Example 5—Composite Electrodes Based on Cobalt/Cobalt Cobaltite Particles and PBI Composite electrodes were produced by moulding with commercial powders of cobalt (purity >99.8%, Fluka) and of cobalt cobaltite $Co_3O_4$ (purity >71%, Fluka) according to Example 1. The cobalt-based composite electrode is used as cathode material, and the $Co_3O_4$-based electrode is used as anode material with contents by mass from 2 to 6 mg/cm² of electrode.

The cathodic and anodic polarization curves were recorded under the same conditions as according to Example 2 (50 mV/s). For comparison, the simple stainless steel grid was tested under the same conditions.

Figure 4:
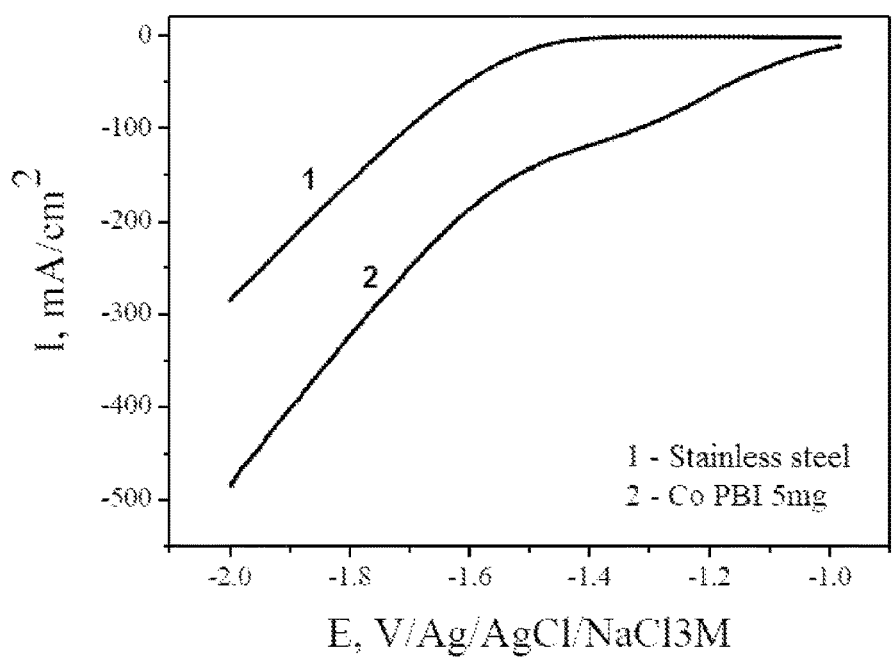
FIG. 4 shows the cathodic polarization curve for an electrode based on cobalt and on PBI (Co loading rate 6 $mg/cm^2$-Co/PBI 90/10) measured in accordance with Example 5.
Figure 5:
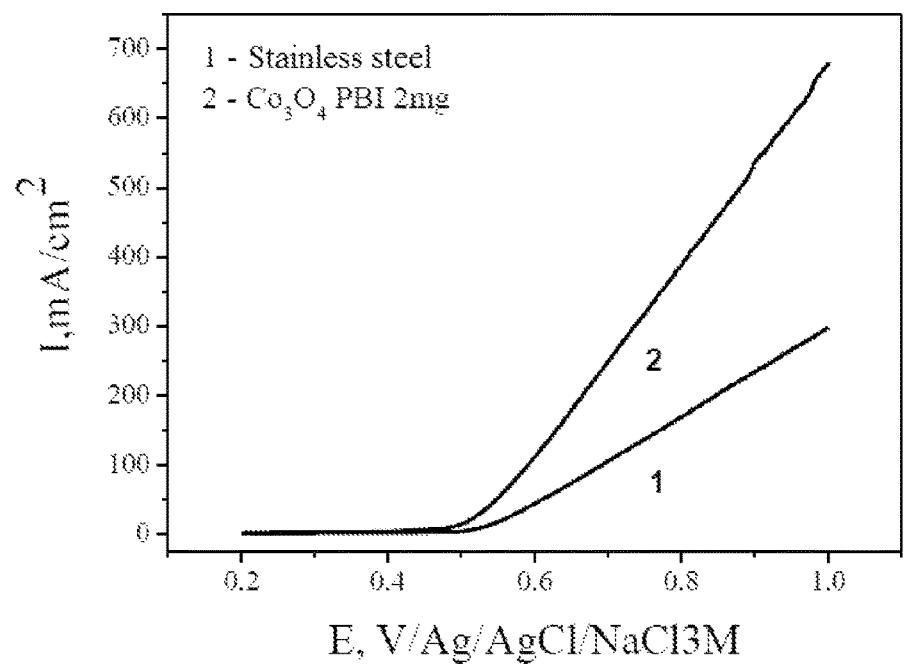
FIG. 5 shows the anodic polarization curve for an electrode based on cobaltite $Co_3O_4$ and on PBI ($Co_3O_4$ loading rate 2 mg/cm$^2$-$Co_3O_4$/PBI 90/10) measured in accordance with Example 5.

The curves shown in FIGS. 4 and 5 were not corrected for ohmic drop.

For each of the composite electrodes, a considerable drop in the overpotential is observed compared with the stainless steel electrode, which therefore manifests itself as a better electrocatalytic activity (more gas for less electric power).

Example 6—Composite Electrode Based on Micrometric Nickel Powder and Chitosan

A commercial micrometric nickel powder (5 µm) was used. The Ni-chitosan proportions in the mixture are 90-10% by mass.

The chitosan in the form of powder is dissolved in glacial acetic acid. A volume of DMSO equal to the volume of acetic acid is added. A gel with a concentration of chitosan of 0.5% by mass is obtained. The gel is mixed with the quantity of nickel powder necessary to have a Ni/chitosan mixture (90/10). Once the mixture has homogenized, it is deposited on a stainless steel grid, dried and then pressed at 2 tonnes/cm² for 2 minutes.

Figure 6:
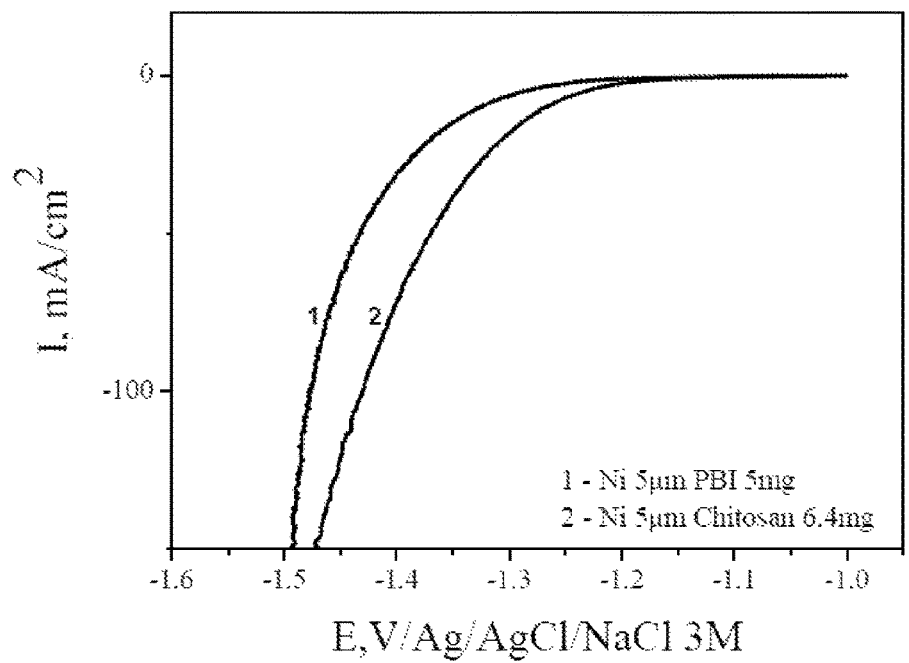
FIG. 6 shows the cathodic polarization curve for a composite electrode based on chitosan-Ni (Ni/chitosan mixture 90/10-Ni loading rate 6.4 mg/cm$^2$) measured in accordance with Example 6.

FIG. 6 shows the polarization curve obtained for this type of Ni/chitosan electrode, as well as the polarization curve obtained for a Ni/PBI electrode as described in Example 2. The results obtained with chitosan are entirely comparable to those obtained with PBI.

Example 7—Composite Electrode Based on Nanometric Platinum Powder and PBI in an Acid Medium A composite electrode was manufactured with a laboratory-synthesized platinum powder the particles of which have a nanometric size (~5 nm) and PBI in accordance with Example 1. The electrode Pt loading rate is 5 mg/cm².

The polarization curve was produced in a standard cell with three electrodes (Ag/AgCl/3M NaCl reference electrode, platinum counter electrode, and work electrode corresponding to the composite electrode based on Pt), at ambient temperature, in a 0.5 mol/L $H_2SO_4$ electrolyte. The measurement was carried out at a speed of potential variation of 1 mV/s, and the curve is corrected for ohmic drop.

Figure 7:
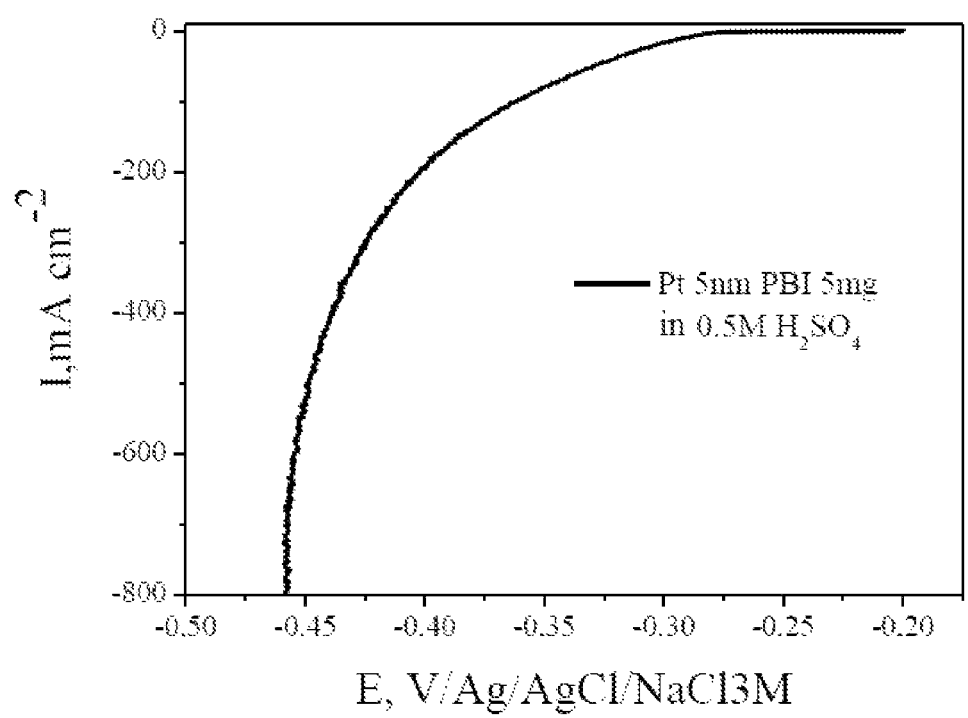
FIG. 7 shows the cathodic polarization curve for a composite electrode based on Pt and on PBI (Pt loading rate 5 mg/cm$^2$-Pt/PBI mixture (90/10)), measured in accordance with Example 7.

FIG. 7 shows the polarization curve obtained for a Pt/PBI composite electrode obtained in an acid medium. The decrease in overpotential is considerable: for a current density of 100 mA/cm² of electrode an overpotential of −164 mV is recorded.

The method for manufacturing the electrodes according to the invention makes it possible to manufacture electrodes for the electrolysis of water in a liquid electrolyte medium from a large variety of electrocatalysts in the form of micrometric, submicrometric or nanometric powder.

The electrodes prepared by this technique meet a whole series of criteria of the specifications specific to the electrodes for electrolysis in an alkaline or acid medium:
 a large active surface area,
 a good mechanical resistance,
 a good stability of the catalytic properties
 low overpotentials
 a good durability.

This method for preparing the electrodes is simple and represents a significant progress in the field of the electrolysis of water.

Moreover, the electrochemical methods which use electrodes manufactured according to the invention, for the electrolysis of water, require lower activation overpotentials, which manifests itself as significant reductions in electric power.

The hydrogen and oxygen obtained according to the method of the invention as well as the mixture thereof can be used in all the applications known to a person skilled in the art. The hydrogen in particular can be used as an energy carrier.

The invention claimed is:

1. A solid electrode configured suitable to be used for the electrolysis of water in a liquid electrolyte medium, the electrode being formed by a formulation method comprising the following steps:
    a) dissolving, in a volatile solvent or a mixture of volatile solvents, at least one ion-conducting polymer binder that allows, in the solid state, the diffusion of the gases formed during electrolysis;
    b) adding, to the solution obtained in step a), at least one electrocatalytic material in the form of divided powder, in order to obtain a mixture; and
    c) depositing the mixture obtained in step b) on a metallic or metallic-type conductive support or collector, said support or said collector being openwork and chemically stable in an aqueous medium,
    steps a) and b) being implemented simultaneously, successively or to be reversed.

2. The electrode according to claim 1, further comprising a step of removing the solvent at the same time as or after step c).

3. The electrode according to claim 1, wherein the electrode is suitable to be used for the electrolysis of water in an alkaline liquid electrolyte medium and in that the polymer binder is an anion conductor in an alkaline liquid electrolyte medium, in particular conductive as regards hydroxides.

4. The electrode according to claim 1, wherein the electrode is suitable to be used for the electrolysis of water in an acid liquid electrolyte medium and in that the polymer binder is a cation conductor in an acid liquid electrolyte medium, in particular conductive as regards protons.

5. The electrode according to claim 1, wherein the at least one electrocatalytic material is chosen from the group comprising Ni, Co, Pt, Ir, Mo, Cr, Fe, V, Mn, Ru, Pd, C, Ti, W, Si, Bi, P, Nb, Zr, Ta and Os, mixtures thereof, alloys thereof as well as simple or complex oxides thereof.

6. The electrode according to claim 1, wherein the mass ratio of polymer binder/divided powder is comprised between 10/90 and 90/10, advantageously comprised between 10/90 and 40/60.

7. The electrode according to claim 1, wherein the divided powder is in the form of particles with an average diameter comprised between 1 µm and 5 µm, or of particles with an average diameter comprised between 10 nm and 1 µm or of particles with an average diameter comprised between 1 and 10 nm.

8. A method for formulating an electrode for the electrolysis of water in a liquid electrolyte medium according to claim 1, comprising the following steps:

a) dissolving, in a volatile solvent or a mixture of volatile solvents, at least one ion-conducting polymer binder that allows, in the solid state, the diffusion of the gases formed during electrolysis;

b) adding, to the solution obtained in step a), at least one electrocatalytic material in the form of divided powder, in order to obtain a mixture; and c) depositing the mixture obtained in step b) on a metallic or metallic-type conductive support, said support being openwork and chemically stable in an aqueous medium, steps a) and b) being implemented simultaneously, successively or to be reversed.

9. The method according to claim 8, further comprising a step of removing the solvent at the same time as or after step c).

10. A device for the electrolysis of water in a liquid electrolyte medium to produce a gaseous mixture of hydrogen and oxygen and/or to produce hydrogen alone and/or to produce oxygen alone, comprising an anode, a cathode and an electrolyte, wherein at least one of the anode and the cathode is an electrode according to claim 1.

11. A method for producing a hydrogen/oxygen mixture or hydrogen alone, and/or for producing oxygen alone by electrolysis of water in a liquid electrolyte medium using a device for electrolysis according to claim 10.

* * * * *